United States Patent [19]

Balsells

[11] Patent Number: 5,134,244
[45] Date of Patent: Jul. 28, 1992

[54] ELECTROMAGNETIC SHIELDING SEAL FOR ROTARY/RECIPROCATING SHAFT

[75] Inventor: Peter J. Balsells, P.O. Box 15092, Santa Ana, Calif. 92705

[73] Assignees: Peter J. Balsells; Joan C. Balsells, Santa Ana, Calif.

[21] Appl. No.: 344,253

[22] Filed: Apr. 27, 1989

Related U.S. Application Data

[63] Continuation-in-part of Ser. No. 186,016, Apr. 25, 1988, abandoned, and a continuation-in-part of Ser. No. 186,018, Apr. 25, 1988, Pat. No. 4,826,144, and a continuation-in-part of Ser. No. 186,017, Apr. 25, 1988, Pat. No. 4,830,344, and a continuation-in-part of Ser. No. 232,430, Aug. 15, 1988, Pat. No. 4,893,795.

[51] Int. Cl.$^5$ .............................................. H05K 9/00
[52] U.S. Cl. .............................. 174/35 GC; 174/35 R; 267/167
[58] Field of Search .......... 174/35 GC, 35 R, 35 MS; 361/424; 219/10.55 R, 10.55 D; 277/235 R, 235 B; 267/167, 168

[56] References Cited

U.S. PATENT DOCUMENTS

| | | | |
|---|---|---|---|
| 1,473,446 | 11/1923 | Scott | 277/163 |
| 1,867,723 | 7/1932 | Adams | 267/167 |
| 2,154,275 | 4/1939 | Linn | 248/358 |
| 2,610,846 | 9/1952 | Hanna | 267/1.5 |
| 2,859,033 | 11/1958 | Rose | 267/1.5 |
| 3,061,060 | 10/1962 | Stephenson | 192/41 |
| 3,183,010 | 5/1965 | Bram | 277/235 |
| 3,223,785 | 6/1967 | Mather | 267/1.5 |
| 3,468,527 | 9/1969 | Mather | 267/1.5 |
| 4,655,462 | 4/1987 | Balsells | 277/164 |
| 4,934,666 | 6/1990 | Balsells | 267/1.5 |
| 4,964,204 | 10/1990 | Balsells | 29/173 |

FOREIGN PATENT DOCUMENTS

| | | | |
|---|---|---|---|
| 0774419 | 5/1957 | United Kingdom | 174/35 GC |
| 1010680 | 11/1965 | United Kingdom | 174/35 GC |
| 2169378 | 7/1986 | United Kingdom | 267/166 |

Primary Examiner—Leo P. Picard
Assistant Examiner—Bot Lee Ledynh
Attorney, Agent, or Firm—Walter A. Hackler

[57] ABSTRACT

An electromagnetic shield for a rotary/reciprocating shaft includes a garter-type resilient coil spring blocking the propagation of electromagnetic waves therepast with the coil spring including a plurality of individual coils for causing a blockage of electromagnetic waves therepast independent of the compression of the coil spring within a range of deflection of the individual coils.

29 Claims, 7 Drawing Sheets

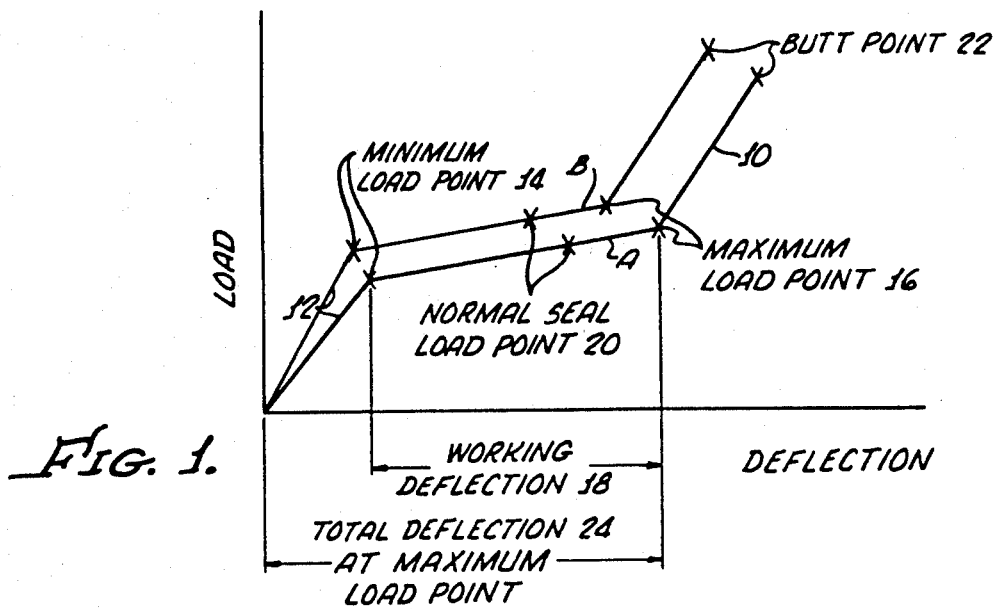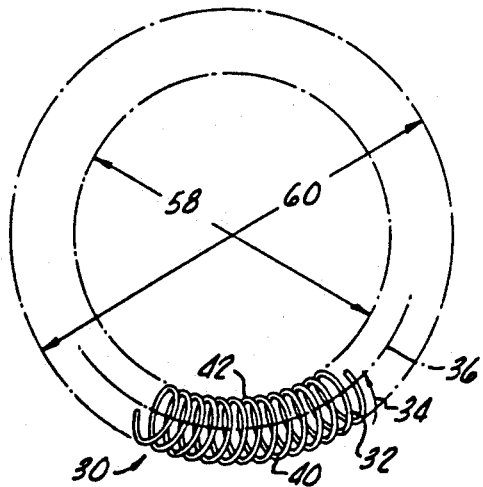

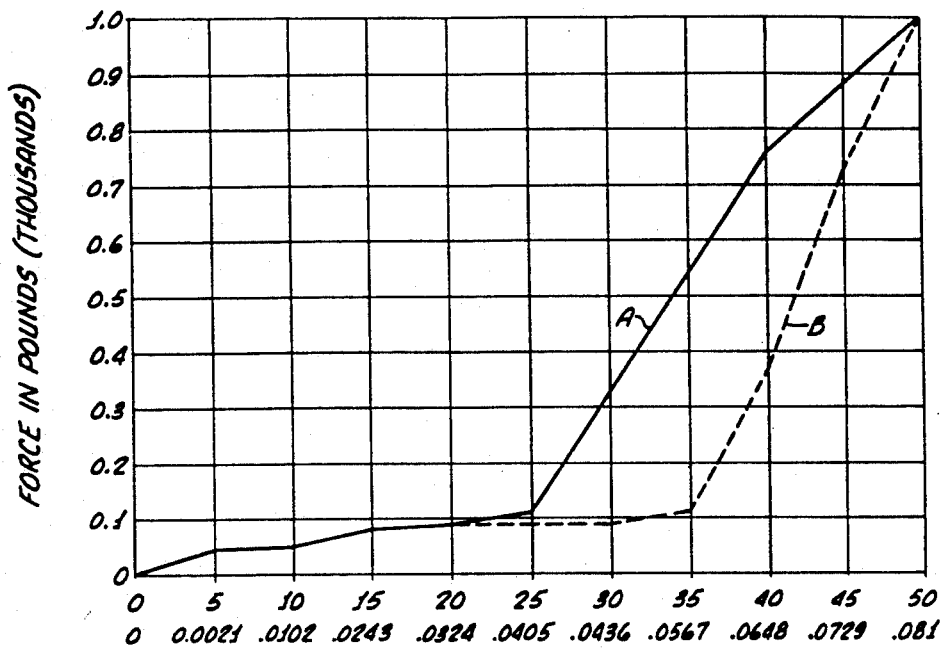
FIG. 4. DEFLECTION IN PERCENT OF COIL HEIGHT
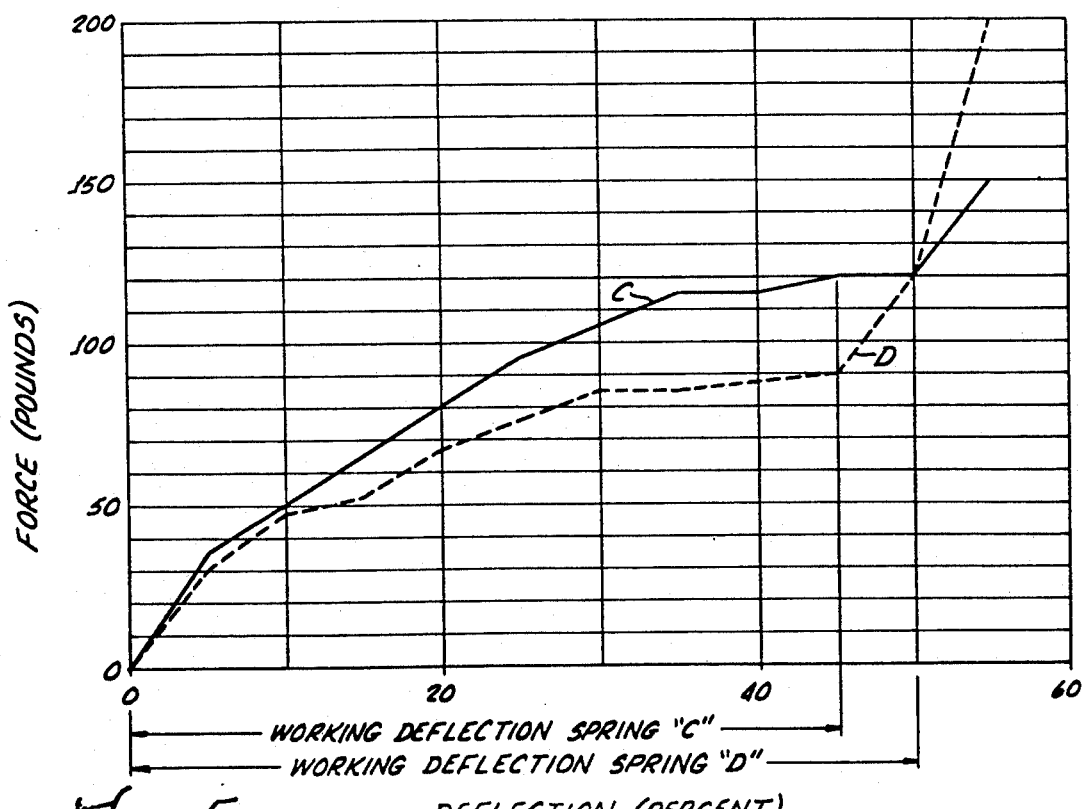
FIG. 5. DEFLECTION (PERCENT)

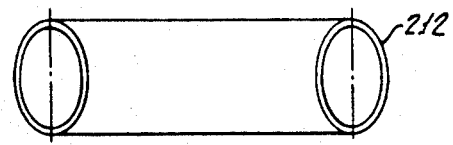
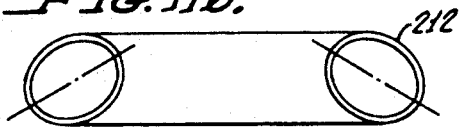
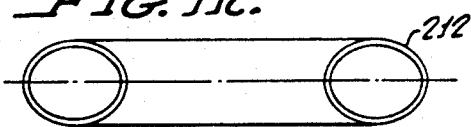
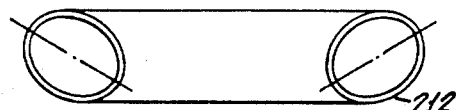
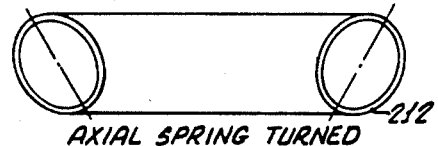
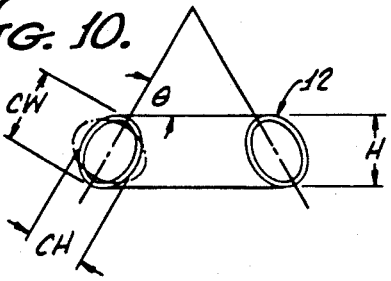
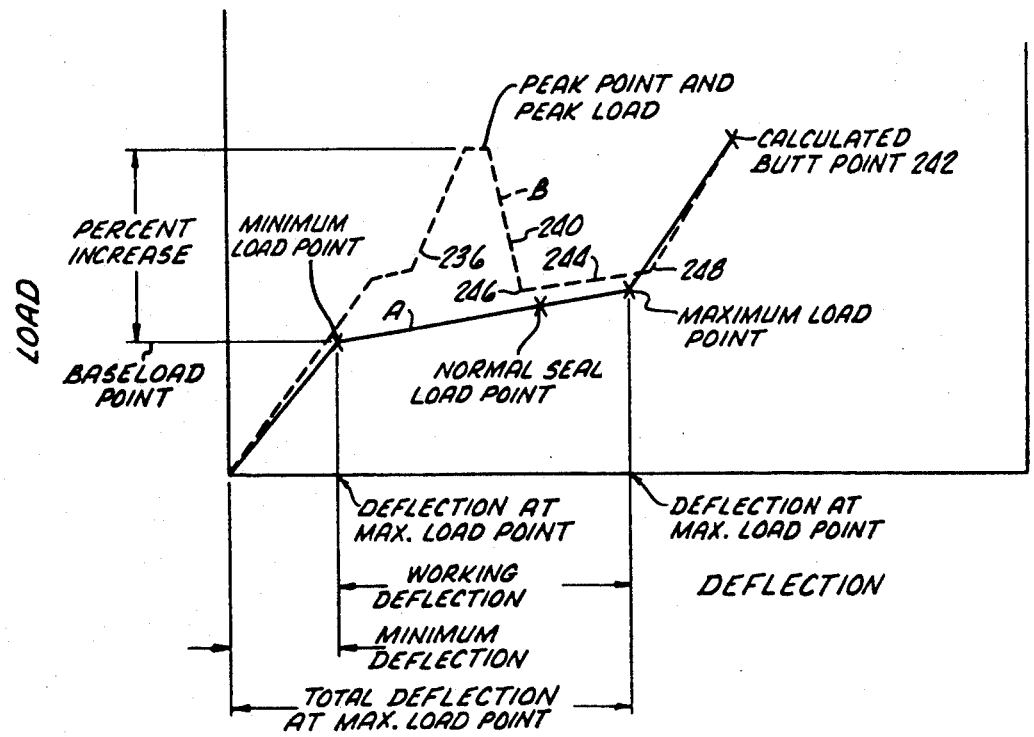

ELECTROMAGNETIC SHIELDING SEAL FOR ROTARY/RECIPROCATING SHAFT

The present application is a continuation-in-part of U.S. patent application No. 186,016 filed Apr. 25, 1988, now abandoned, U.S. patent application Ser. No. 186,018 filed Apr. 25, 1988, now U.S. Pat. No. 4,828,144, U.S. patent application Ser. No. 186,017 filed Apr. 25, 1988, now U.S. Pat. No. 4,830,344, and U.S. patent application Ser. No. 232,430 filed Aug. 15, 1988, now U.S. Pat. No. 4,893,795.

The present invention generally relates to electromagnetic shielding and, more particularly, the invention is directed, to electrically conductive gaskets, or seals, for enabling the installation of rotary and/or reciprocating shafts without the transmittal or leakage of electromagnetic energy therepast independent of loading forces on the gasket or seal.

Electronic equipment is often associated with the control of power equipment. In that regard it may be necessary to couple mechanical power through areas where microwaves are either generated as areas which must be shielded from microwaves.

The problems associated with unwanted electromagnetic energy leakage and interference has been known for some time, and it should be easily appreciated that a reciprocating or rotating shaft poses a unique electromagnetic shielding problem.

Heretofore, electromagnetic shields for rotary/reciprocating shafts have been formed of conductive elastomers and/or braided cables.

While electrically conductive elastomers provides electromagnetic shielding to a certain extent, they are subject to permanent deformation upon loading. That is, they take a "set" upon loading and thereafter upon a change in such loading create a gap, or separation, which allows the transmission of electromagnetic energy therepast.

This problem becomes more acute when the gasket is subjected to thermocycling. Repeated heating and cooling of the gasket during operation of the shaft may cause significant relaxation, thereby leaving openings which electromagnetic energy can pass through.

Irregularities in the shaft and a housing, or the like, through which it is mounted, may include surface deformations or surface finishes which do not intimately engage one another and thereby cause particular electromagnetic shielding problems.

Regarding the frequency of electromagnetic energy, in particular, microwave bands for commercial service applications generally range from about 100 MHz to about 1 GHz, while military service applications may range from 1 GHz to 300 GHz. Electromagnetic energy as used herein is a generic term including the full spectrum of electromagnetic energy frequencies and specifically as used hereinafter, electromagnetic interference (EMI) and radio frequency interference (RFI) may be used interchangeably, with both referring to interference caused by unwanted electromagnetic energy or radio frequency energy entering a designated piece of equipment. In general, the ability to shield a component from egress or ingress or electromagnetic energy is often called shield effectiveness.

A factor of prime importance in electromagnetic shielding is the frequency of the electromagnetic energy or the wave length thereof. It is known that all electromagnetic waves consist of two essential components, a magnetic field and an electric field. These two fields are perpendicular to each other, and the direction of wave propagation is at right angles to the plane containing these two components. The relative magnitude between the magnet (H) field and the electric (E) field depends on how far away the (e) field depends on how far away the wave is from its source, and on the nature of the generating source itself. The ratio of E to H is called the wave impedance, $Z_w$.

Thus, it can be seen that shield effectiveness for a particular gasket may differ, depending on whether the electromagnetic energy is generated in associated equipment or in equipment remote from the gasket.

If the source contains a large current flow compared to its potential, such as may be generated by a loop, a transformer, or power lines, it is called a current, magnetic, or low impedance source, having a small E to H value. On the other hand, if the source operates at a high voltage, and only a small amount of current flows, the source impedance is said to be high, and the wave is commonly referred to as an electric field.

It is important to realize that at very large distances from a source, the ratio of E to H to equal for either wave, regardless of its orientation. When this occurs, the wave is said to be a plane wave, and the wave impedance is equal to 377 ohms, which is the intrinsic impedance of free space.

It is known that metals have an intrinsic impedance that approaches zero as conductivity approaches infinity. Because of the great difference between the intrinsic impedance of metals and the intrinsic impedance of free space, waves generated from sources remote from the metal receptor will have most of the energy reflected therefrom and very little will be transmitted therepast. This, of course, is not true for magnetic or low impedance fields, in which less energy is reflected, and more is absorbed thereby making it more difficult to shield against magnetic fields. Because magnetic shields have less than infinite conductivity, part of the field is transmitted across the boundary which is dependent upon the thickness of metallic shield.

A far greater factor in shield effectiveness is the presence of openings or gaps in the shield. A gap or opening in the shield will allow electromagnetic fields to radiate through the shield unless the current continuity can be preserved across the gaps. Therefore, the function of an EMI gasket is to preserve the continuity of current flow in the shield.

The importance of the gap is, of course, dependent upon the frequency of the impinging electromagnetic energy. For example, electromagnetic energy having frequency of one GHz has a wavelength of approximately 11.6 inches, while electromagnetic energy of 100 GHz has a wavelength approaching 0.12 inches. As a general rule, for effective shielding in commercial use, the opening size should be less than the wavelength of the electromagnetic energy divided by 20 and for avionics use the opening size should be less than 1/50th of the wavelength of the electromagnetic energy.

Other factors bearing directly on the gap size and therefore shield effectiveness is the surface finish of mating parts to be sealed, the ability of the shielding material to withstand environmental changes with no or little changes in conductivity, due to corrosion galvanic action, etc. The ability of the gasket to provide dimensional stability with a constant load throughout the life of the gasket between the mating parts is important in order to prevent changes in the continuity of the gasket and to prevent the opening of gaps therein, which may be unacceptable in terms of shield effectiveness.

The gasket shield of the present invention provides an effective electromagnetic shield through the use of a canted-coil spring with closely spaced coils that deflect upon loading, for providing a nearly constant force between mating points, and/or surfaces, in order to assure a high degree of conductivity, and therefore a high shield effectiveness within useful temperature and cycling requirements. In addition, the gasket shield of the present invention provides sufficient flexibility to take up for variations that may occur due to torquing, eccentricities, irregularities and other variables, and still maintain the required loading and open low area for effective shieldings from very low frequencies to extremely high frequencies.

SUMMARY OF THE INVENTION

An electromagnetic shielding for a rotary/ reciprocating shaft in accordance with the present invention generally includes garter-type resilient coil spring means for blocking the propagation of electromagnetic waves therepast with the coil spring means including a plurality of individual coil means for causing the coil spring means to block the propagation of electromagnetic waves therepast independent of compression of the coil spring means within a range of deflection of the individual coil means.

The individual coil means are canted along a centerline thereof and include back angle means for both defining the disposition of a trailing portion of each coil means with respect to a line normal to the centerline and for determining the force-deflection characteristics of the coil spring means and front angle means for defining the disposition of a leading portion of each coil means with respect to the normal line.

The front angle means are greater than said back angle means and the coil means are interconnected in a manner forming a garter-type resilient coiled spring.

Means are also provided for supporting the garter-type resilient coil spring between a shaft and a housing surrounding the shaft.

More particularly, the coil means may be interconnected in a manner forming an axially or radially resilient coiled spring and a conductive elastomer may be disposed within the garter-type resilient coil spring means.

The means for supporting the garter-type resilient coil spring may include a groove disposed in the housing or the shaft and further means may be provided for causing axial loading of said garter-type resilient coil spring upon radial loading thereof in order to enhance the electromagnetic shielding characteristics of the resilient coil spring by reducing coil spacing thereof. This last mentioned means may include a groove having tapered walls for axially comprising the resilient coil spring as it is subject to radially loading by the shaft.

BRIEF DESCRIPTION OF THE DRAWINGS

The advantages and features of the present invention will appear from the following description when considered in conjunction with the accompanying drawings in which:

FIG. 1 is a load versus deflection curve illustrating the various parameters of a resilient coil spring in accordance with the present invention with a back angle on the inside of the spring, curve A, and with a back angle on the outside of the spring, curve B;

FIGS. 2a and b are plan and side views, respectively, of a circular welded clockwise wound (Series RF-RF) spring with a back angle defining a trailing portion along the inside diameter of the spring and a front angle defining a leading portion along the outside diameter of the spring, in accordance with the present invention.

FIG. 3a and b are plan and side views, respectively, of a circular clockwise wound spring having the same physical dimensions as the spring shown in FIG. 2a, 2b, also having a back angle defining a leading portion along the outside diameter of the spring and a front angle defining a trailing portion along an inside diameter of the spring;

FIG. 4 is a load versus deflection curve for the springs shown in FIGS. 2 and 3;

FIG. 5 shows load deflection curves for a variety of axially loaded springs with the trailing portion along the inside diameter (Series RF-RF) thereof corresponding to the spring dimensions set forth in Table 1;

FIG. 9 shows load deflection curves for springs made in accordance with the present invention.

FIG. 10 is a schematic of an axially canted coil spring with turn angle $\theta$ shown for the purpose of illustrating how the turn angle $\theta$ may be calculated;

FIGS. 11a, b, c and d and e illustrate axial springs having various turn angles;

DETAILED DESCRIPTION

Figure 6:
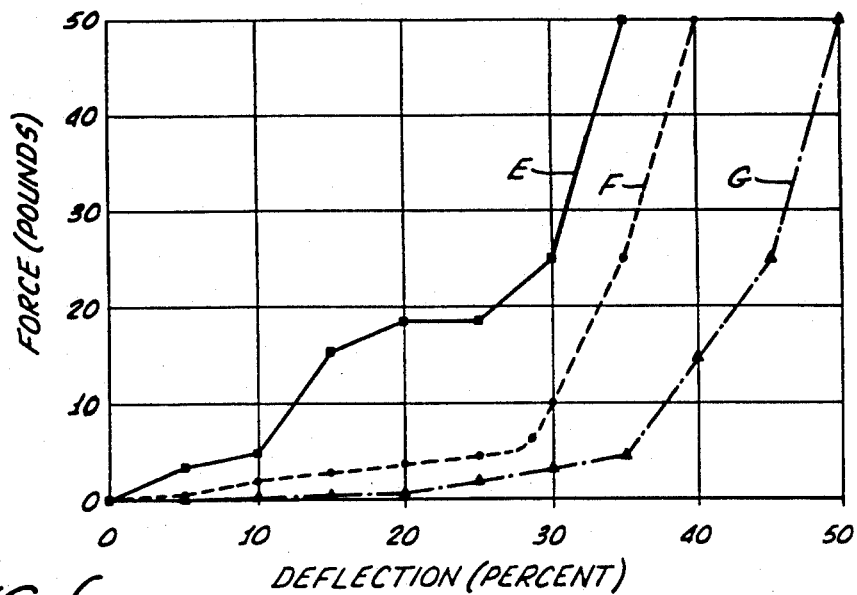
FIG. 6 shows load deflection curves for axially springs having different back angles.

Turning now to FIG. 1 there is shown an exemplary load-deflection curve 10 for the purpose of illustrating the characteristics of canted coil resilient coiled springs suitable for electromagnetic shields in accordance with the present invention.

As shown in FIG. 1 when a load is applied to the spring, the spring deflects in a generally linear fashion as shown by the line segment 12 until it reaches a minimum of load point 14 which represents the point at which, after the initial deflection, the load begins to remain relatively constant. It is to be appreciated that for an axially resilient garter-type spring, hereinafter described, the load is applied axially and for a radially resilient garter-type spring, hereinafter described, the load is radially applied.

Between the minimum load point 14 and a maximum load point 16, the load deflection curve may be constant or show a slight increase as shown in FIG. 1. The area between the minimum load point 14 and maximum load point 16 is known as the working deflection range 18. The spring is normally loaded for operation within this range, as indicted by point 20, for a typical spring utilized in conjunction with a seal, gasket, or the like, for both sealing and electromagnetic shielding purposes. Loading of the spring beyond the maximum load point 16 results in an abrupt deflection response until it reaches a butt point 22, which results in a permanent set in the spring as a result of overloading. Also indicated in FIG. 1, is the total deflection range 24, which is defined as the deflection between the unloaded spring and the deflection at the maximum load point 16.

FIGS. 2a and 2b show a circular welded spring 30, in accordance with the present invention, generally showing a plurality of coils 32 wound in a clockwise fashion (see arrow 34) which are canted in a counterclockwise direction along a centerline 36 thereof. It should be appreciated that the springs could have coils canting counterclockwise along the centerline 36 of the spring. In addition, the spring could also be counterclockwise wound (Series RF-RF) with the coils canting clockwise with the back angle on the I.D. of the spring.

As more clearly shown FIG. 2b, each coil may include a trailing portion 42 and a leading portion 40 with the trailing portion having a back angle 48 which provides for means for both defining the disposition of the trailing portion 40 of each coil 32 with respect to a normal line 50 and for determining the working resilient range of the spring 30 as hereinafter described in greater detail.

In addition, a front angle 54 provides means for defining the disposition of the leading portion 42 of the coil 32 with respect to the normal line.

The spring 30 is formed by interconnecting the coils 32 in a manner forming a garter-type axially resilient coil spring with the trailing portion 40 along an inside diameter 58 (see FIG. 2a) of the spring 30 and the leading portion 42 along an outside diameter 60 of the spring 30.

As can be seen most clearly in FIG. 2b, the spring 30, in accordance with the present invention, always has a leading portion 40 disposed at a front angle 54, which is greater than the back angle 48 defining the trailing portion 42. That is, as the coil is traced in the circular-like manner about the centerline 36 each revolution includes a trailing portion and a leading portion, with the leading portion advancing movement along the centerline 36 more than the advancement along the centerline 36 when following the trailing portion 42 of the coil 32. This definition of the leading and trailing portions of the coils applies to both clockwise and counterclockwise wound springs and the leading portions may be on the outside or the inside of the spring.

FIGS. 3a and 3b show a circular welded spring 68, in accordance with the present invention, having the same physical dimensions and wire sizes as spring 30, shown in FIGS. 2a and 2b, with the spring 68 wound in a clockwise fashion (see arrow 70). In this instance, the spring 68 includes a plurality of coils 72, each having a leading portion 74 and a trailing portion 76 which are defined, respectively, by a back angle 80 and a front angle 82, as shown in FIG. 3b. It should again be appreciated that the coils may also be canted clockwise along the centerline thereof and the spring could also be counterclockwise wound (Series F) with the coils canting counterclockwise with the back angle on the O.D. of the spring.

Similar to spring 30, the coils 72 of spring 68 are interconnected in a manner forming a garter-type axially resilient coiled spring 68 in which the trailing portion falls along an outside diameter 84 and the leading portion falls along an inside diameter 84 of the spring 68.

Curve A of FIG. 4 represents the performance of the spring 68, while spring B represents the performance of spring 30. Although the two springs have almost identical force-deflection characteristics in their working deflection range, the maximum load points have a variation of about 40 percent.

It has been found that, in accordance with the present invention, the back angle can be varied from as little as one degree to 35 degrees as long as the front angle 54 is greater than the back angle and is larger than 20 degrees and less than 55 degrees. Variation in the back angle of the spring significantly affects the resilient characteristics of the spring independent of the front angle. This is shown in FIG. 5 which is a force-deflection curve for springs C and D having spring parameters set forth in Table 1. It should be appreciated that the spring parameters set forth herein are provided only to illustrate the effect of spring back angle and disposition of the trailing portion. Actual spring parameters depend upon the desired spring size, loading and application.

Springs C and D are identical springs having the same wire diameter, spring inside diameter coil height and approximately the same front angle, but the back angle and correspondingly the coil spacing is varied. As can be seen in FIG. 5, the working deflection of spring D is approximately 45 percent whereas the working deflection of spring C is 50 percent. This is independent of the front angle. Hence, springs can be designed with varying resilient characteristics, such as the force required to deflect the spring, utilizing a spring having the same wire diameter inside diameter and coil height than was heretofore possible with only varying the front angle of the spring.

TABLE 1

| Spring No. | Wire Dia. (d) (inches) | Spring I.D. (inches) | Coil Height (h) (inches) | Back Angle (degrees) | Front Angle (degrees) | Coil Spring (s) (inches) |
| --- | --- | --- | --- | --- | --- | --- |
| C | 0.022 | 0.840 | 0.161 | 10.5° | 38° | 0.043 |
| D | 0.022 | 0.840 | 0.161 | 16.25° | 38° | 0.032 |

TABLE 2

| Spring No. | Wire Dia. (d) (inches) | Spring I.D. (inches) | Coil Height (h) (inches) | Back Angle (degrees) | Front Angle (degrees) | Coil Spring (s) (inches) |
| --- | --- | --- | --- | --- | --- | --- |
| E | 0.016 | 0.850 | 0.163 | 11° | 21° | 0.016 |
| F | 0.016 | 0.850 | 0.163 | 27° | 38° | 0.016 |
| G | 0.016 | 0.850 | 0.163 | 34° | 45° | 0.016 |

As hereinabove described, increased force-deflection characteristics can be used to advantage in conjunction with a sealant, or gasket materials, wherein the spring cavity is predetermined, the latter dictating spring I.D. and coil height.

When the coil spacing is held constant, the back angle along with the front angle may be varied to custom design a spring to tailor the resilient characteristics. For example, the smaller the back angle, the higher the force necessary to deflect the spring, as shown in FIG. 6, for Springs E, F and G defined in Table 2. This enables springs to be made with smaller wire and close coil spacing. Conversely, as the back angle is increased, the working deflection is increased when the coil spacing is held constant.

This characteristic is important and enables the coiled spring in accordance with the present invention to be effective as electromagnetic shielding gasket, either by themselves or in conjunction with conductive elastomers as hereinafter described.

Figures 7A, 7B:
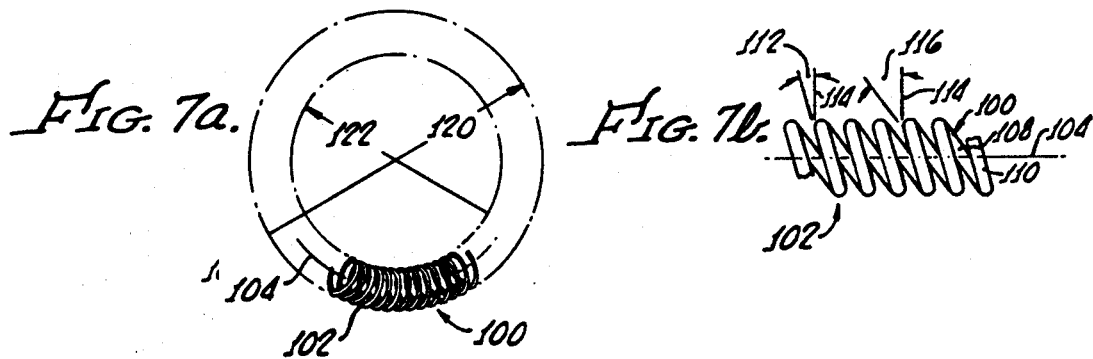
FIG. 7a and b are plan and side views, respectively, of a circular welded clockwise spring, in accordance with the present invention, with a front angle on the outside of the spring and a back angle on the inside of the spring.

Turning now to FIG. 7a and 7b, there is shown a circular welded clockwise spring 100 in accordance with the present invention, generally showing a plurality of coils 102, which are canted in a clockwise direction along a centerline 104 thereof. As more clearly shown in 7b, each coil 102 includes a leading portion 108 and a leading portion 110, with the trailing portion having a back angle 112 which provides for means for both defining the orientation of the trailing portion 110 of each coil 102 with. respect to a normal line 114 and for determining the working resilient range of the spring 100 as hereinafter described in greater detail.

In addition, a front angle 116 provides the means for defining the orientation of the leading portion 110 of the coil 102 with respect to a normal line 114.

The spring 100 is formed by interconnecting the coils 102 in a manner forming a garter-type axially resilient coil spring with the trailing portion 108 along an outside diameter 120 (see FIG. 7a of the spring 100 and a leading portion 110 along an inside diameter 122 of the spring 100).

As can be seen most clearly in FIG. 7b, the spring 100, in accordance with the present invention, always has a leading portion 108 disposed at a front angle 116, which is greater than the back angle 112, defining the trailing portion 110. That is, as the coil is traced in the circular-like manner about the centerline 104, each revolution includes a leading portion 108 and a trailing portion 110, with the leading portion 108 advancing along the centerline 104 more than advancement along the centerline 104 when following the trailing portion 110 of the coil 102.

As hereinbefore noted, it must be appreciated that the inside back angle canted coil spring 30, in FIG. 2a, while having the same general load/deflection characteristics as the outside back angle canted coil spring 88 in FIG. 3a, the specific load/deflection characteristics of each spring are different. For example, an inside back angle canted coil spring 30 having the same wire size and dimension as an outside back angle canted coil spring 68 will generally have a lower maximum load point (see FIG. 1, curve A) than the outside back angle canted coil spring (see FIG. 1, curve B).

Figure 8:
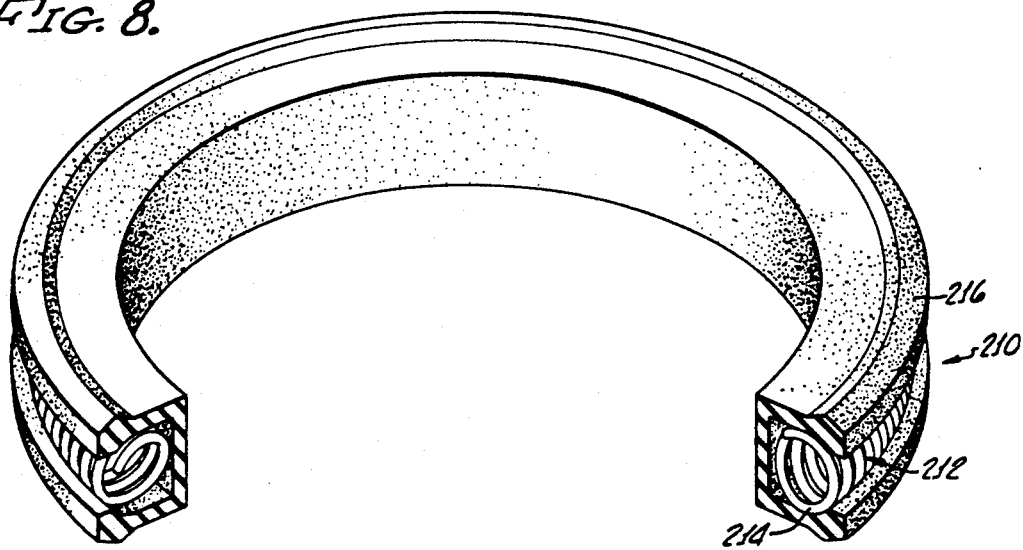
FIG. 8 is a perspective view of an electromagnetic shielding gasket generally including an annular axially resilient coil, in accordance with the present invention, generally showing a plurality of coils interconnected in a manner forming a garter-type axially resilient coil spring, with the spring being disposed in an annular seal with a preselected turn angle orientation for controlling a resilient characteristics of the annular axially resilient coil spring, non-invasive support of the spring within the annular seal enabling independent working of the spring therein, thereby providing preselected force concentration on the sealing portions of the seal.

Turning now to FIG. 8, there is shown an electromagnetic shielding gasket 210 in accordance with the present invention, generally showing a garter-type axial spring 212 with a plurality of coils 214 in an annular seal 216 which provides means for non-invasively supporting the garter-type axially resilient coil spring 212, in a preselected orientation for controlling the resilient characteristics thereof, as hereinafter described in greater detail. The gasket 210 may be formed of plastic which, of course, offers by itself no electromagnetic shielding unless a metallic filler is used, as may be desirable. Alternatively, the gasket may be formed from a suitable metallic material to enhance electromagnetic shielding.

In FIG. 9 there is shown a load-deflection curve A, representative of the hereinbefore discussed spring 30 and 100 for comparison purposes. Also shown is a load-deflection curve B for a spring made in accordance with the present invention having a turn angle for the purpose of illustrating the characteristics thereof.

The load-deflection curve B shows the characteristics of the spring 212 made in accordance with the present invention, showing a linear load-deflection segment 236 until a peak load point 238 is reached. After the peak point 238, the load decreases with deflection in segment 240. This results in a saddle-type deflection range between the peak point 238 and the butt point 242.

This type of load-deflection characteristic may have specific advantage for electromagnetic spring seals which are locked in position, such as a groove, with the tension thereof being caused by the spring. In this instance, while the spring produces a relatively constant load over a given working deflection range 244, changes beyond the working range limits at points 248, 248, causes an abrupt increase in load. This causes the spring seal to be self-centering within a groove, or the like.

FIG. 10 shows a schematic form a cross-section of a canted coil spring, in accordance with the present invention, with a turn angle of $\theta$ a measured coil width of CW, a measured coil height of CH and a measured spring height H of the spring 212, as shown in FIGS. 11a, b, c and d. The turn angle may be clockwise (bold lines) or counterclockwise. (Dashed lines).

As shown in FIG. 11c, an axially flat spring 212 may be turned up counterclockwise, for example, 30 degrees, as shown in FIG. 11b, or turned clockwise, as for example, shown in FIGS. 11d and 11e, with 30 degrees and 60 degrees turn angles, respectively. It should be appreciated that while the springs shown are shown with a circular shape, other shapes are possible, such as elliptical or rectangular, depending upon the configuration of the mating parts between which the spring 212 and/or seal 216 are to be placed.

As shown in the Figures, the turn angle $\theta$ is defined as an angle formed by a generally circular spring forming a cone or an inverted cone, depending on the position of the spring and measuring the angle $\theta$ from the horizontal to the intersection through the centerline of each cone, or inverted cone. By varying the turn angle $\theta$, different loads can be obtained and the degree of loading depends upon the turn angle $\theta$. That is, the higher the turn angle $\theta$, the higher the force developed, as will be hereinafter demonstrated. It should be noted that the force developed upon loading is independent upon whether the spring is in the cone shape as shown in FIG. 11b, or an inverted cone as shown in 11d. That is the springs in 11b and 11d will perform in identical fashion.

Figure 12:
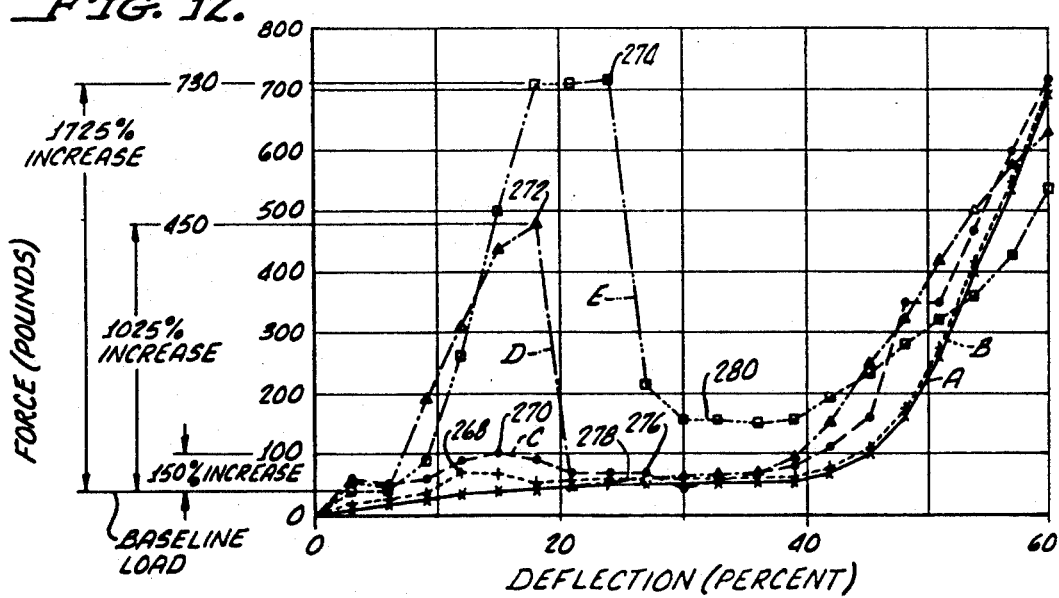
FIG. 12 is a plurality of force-deflection curves, each corresponding to an annular axially resilient coil spring having different turn angle orientation.

Curves A, B, C and D, in FIG. 12 show the force-deflection characteristics of a series of springs, with $\theta$ varied from zero degrees to 90 degrees, with a specification of these springs being set forth in Table 3. Each of the springs A, B, D, D, are identical in all respects, except for the turn angle $\theta$.

Curve A in FIG. 12 represents a spring 212 with a turn angle of zero and is representative of the springs 30 or 100. Curve B represents the spring 212 having a turn angle of 15 degrees and manifests a threshold rise 268 characteristic of springs made in accordance with the present invention. This gradual rise develops into the peak load characteristics more clearly shown by curves C, D and E, corresponding to springs C, D and E of Table 3.

As shown in FIG. 12, as the turn angle $\theta$ increases, the load increases at a maximum about 90 degrees.

TABLE 3

| | Spring Height (CH) | | | 0.163 in. | | |
|---|---|---|---|---|---|---|
| | Coil Width (CW) | | | 0.180 in. | | |
| | Turned Height (H) | | | 0.179 in. | | |
| | Wire Diameter (WD) | | | 0.222 in. | | |
| | Coil Spacing | | | 0.018 in. | | |
| | Number of Coils | | | 67 | | |

| Spring | Turn Angle (deg.) | Peak Load Value (lbs.) | Increase Over Base Load (%) |
|---|---|---|---|
| A | 0 | NA | NA |
| B | 15 | 100 | 100% |
| C | 58 | 100 | 150% |
| D | 76 | 450 | 1025% |
| E | 90 | 730 | 1725% |

| Spring | # of Coils | Coil Height (in) | Coil Width (in) | Turned Height (in) | Wire Dia. (in) | Turn Angle (deg) | Coil Spring (in) | Trailing Portion |
|---|---|---|---|---|---|---|---|---|
| F | 67 | 0.162 | 0.179 | 0.164 | 0.022 | 32° | 0.018 | Outside diameter |
| G | 67 | 0.162 | 0.179 | 0.164 | 0.022 | 42° | 0.018 | Inside diameter |

Importantly, after the peak load, as shown at 270, 272, 274, respectively, is achieved, the force decreases rapidly to approximately the forces shown by springs A and B. Thus, these springs have working regions 276, 278 and 280, approximately the same as unturned spring A; however, as can be seen in FIG. 12, these working areas are bounded by steep load-deflection characteristics. Springs, in accordance with the present invention, have advantages in a variety of applications, as hereinabove described. As hereinbefore mentioned, although the spring shown generally are circular in shape, they could be used in other applications in irregular shapes. That is, the spring will easily fit into other shapes than round.

As shown in Table 3, the peak load is substantially greater than the base load and in fact reaches to 1725 percent when the turn angle is 90 degrees. Hence, by using a turn angle, higher load can be provided. Consequently, as hereinbefore mentioned, a smaller wire can be used which will permit the use of more coils per inch thus decreasing the stress that will occur on the seal when loaded and increase the shielding effectiveness of the gasket 210.

Also, as hereinbefore pointed out, springs, in accordance with the present invention, exhibiting the force-deflection curves as shown by curve C, D and E of FIG. 12, can be used in self-locking and self-centering applications not heretofore possible by springs exhibiting force-deflection curves as shown by curve A in FIG. 9.

Figure 13:
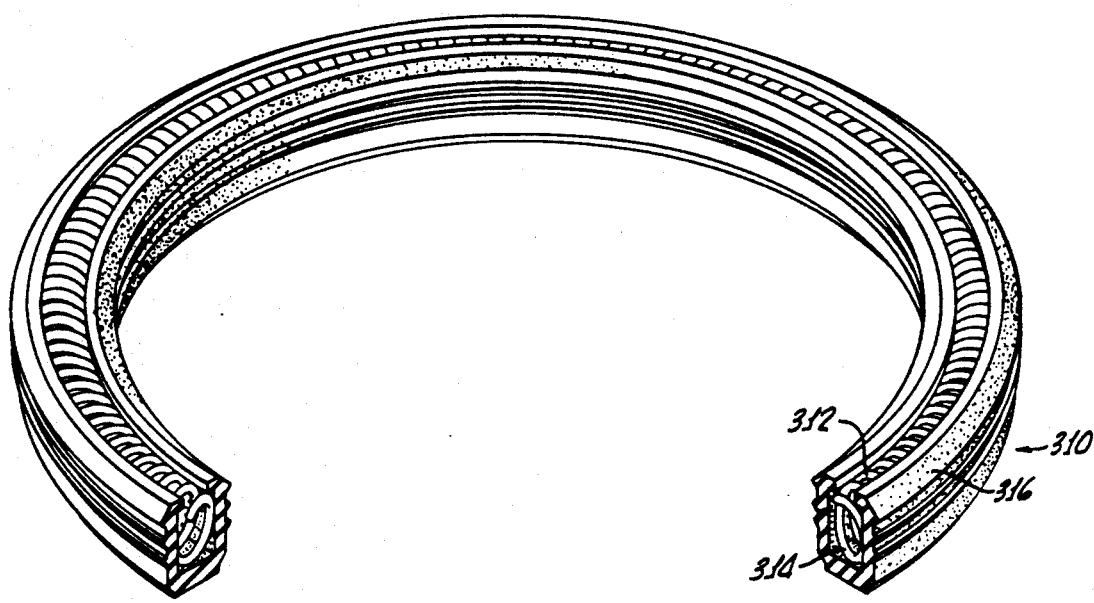
FIG. 13 is a perspective view of an electromagnetic shielding gasket including a radially loaded coiled spring seal, in accordance with the present invention, generally showing a plurality of coils interconnected in a manner forming a radially resilient canted coiled spring, with the spring being disposed in an annular seal with a preselected turn angle orientation for controlling the load-deflection characteristics of the radially resilient canted coiled spring, non-invasive support of the spring within the annular seal enabling independent working of the spring therein, thereby providing preselected force concentration on the sealing portions of the seal.

Turning now to FIG. 13, there is shown an electromagnetic shielding gasket 310 including a radially resilient coiled spring 312, in accordance with the present invention, generally showing the radially resilient spring 312 with a plurality of coils 314 in an annular seal 316 which provides means for non-invasively supporting the garter-type radially resilient coil spring 312, in a preselected orientation for controlling the resilient characteristics thereof, as hereinafter described in greater detail.

The load-deflection curve for the spring 312 is illustrated in FIG. 1.

Figure 14:
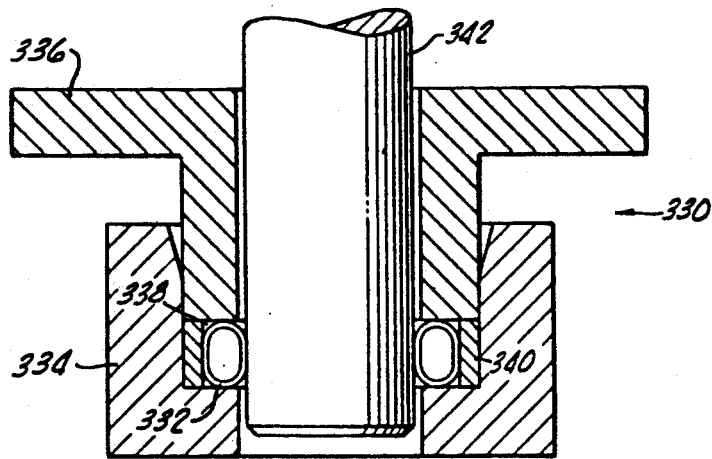
FIG. 14 shows test jig apparatus for the determination of the load-deflection characteristics.

The load-deflection characteristics may be determined with a test jig 330 as shown in FIG. 14. A radially resilient spring 332 is held within a housing 334 by a fixture 336, thereby entrapping the spring 332 in a cavity 338. A circumferential spacer 340 is used to load the outside diameter of the spring 332 and the force required to pass a plug 342 through the inside diameter of the spring 332 is measured.

A radially resilient spring 312 may be turned up counterclockwise, as shown in FIGS. 11a, b, c, d and e, for example, 30 degrees, as shown in FIG. 11b, or turned clockwise, as for example, shown in FIGS. 11d and 11e, with 30 degrees and 60 degrees turn angles, respectively. It should be appreciated that while the springs shown are shown with a circular shape other shapes are possible, such as elliptical or rectangular, depending upon the configuration of the mating parts between which the spring 312 and/or seal 316 are to be placed.

As shown in the Figures, the turn angle $\theta$ is defined as an angle formed by a generally circular spring forming a cone or an inverted cone, depending on the position of the spring and measuring the angle $\theta$ from the horizontal to the intersection through the centerline of each cone, or inverted cone. By varying the turn angle $\theta$, different loads can be obtained and the degree of loading depends upon the turn angle $\theta$. That is, the higher the turn angle $\theta$, the higher the force developed, as will be hereinafter demonstrated. It should be noted that the force developed upon loading is independent upon whether the spring is in the cone shape as shown in FIG. 11b, or an inverted cone as shown in 11d. That is, the springs in 11b and 11d will perform in identical fashion.

The spring 312 may also have a trailing portion defined by a back angle and a leading portion defined by a front angle as hereinbefore described.

When loading the spring 312 radially, the load is greater when the turn angle is 90 degrees than when the turn angle is 0 degrees and such load increases progressively from 0 degrees to 90 degrees. In addition, a spring 312 with a back angle, or trailing portion along the outside O.D. of the spring will develop substantially higher force than a spring having a back angle or trailing portion along the inside I.D. of the spring with both springs having the same turn angle.

This enables greater tailoring ability. That is, a greater range of wire size and coil spacing can be used while still exerting the same or greater force in response to deflection. This has significant advantage when the spring is used in conjunction with a seal as hereinbefore described for electromagnetic shielding.

Figure 15:
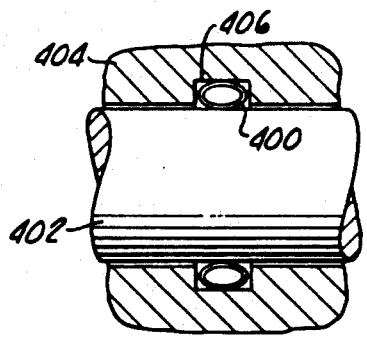
FIG. 15 is a cross-sectional view of an electromagnetic shield radial spring disposed between a shaft and a housing within a groove in the housing.
Figure 16:
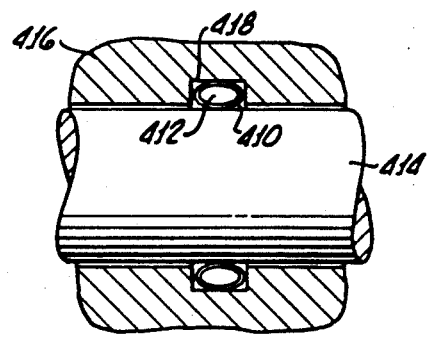
FIG. 16 is a cross-sectional view of an alternative embodiment of the electromagnetic shield radial spring of the present invention showing a spring filled with a conductive elastomer.

With the hereinabove description of various canted coil springs suitable for use as electromagnetic shields, the reader's attention is now directed to FIG. 15, which shows a typical application of a spring shield 400 disposed between a shaft 402 and a housing 404 by means of a groove 406. As shown in FIG. 15, the shield 400 is a radially resilient spring as hereinbefore described. An alternative embodiment of the shield as shown in FIG. 16 in which a spring 410 is filled with a conductive elastomer 412 and disposed between a shaft 414 and a housing 416 by means of a groove 418.

Figure 17:
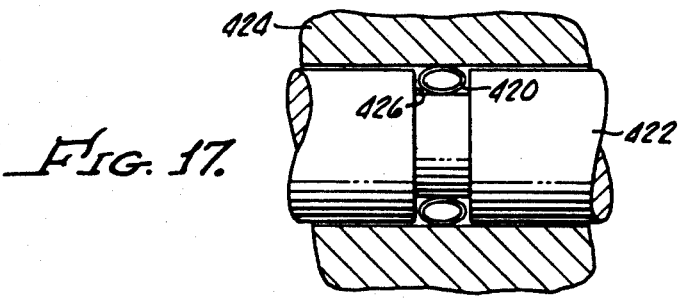
FIG. 17 is a cross-sectional view of an alternative embodiment of the present invention in which the shield is disposed in a shaft groove.

Yet another embodiment of the present invention is shown in FIG. 17 in which a radially resilient spring shield 420 is disposed between a shaft 422 and a housing 424 by means of a groove 426.

Figure 18:
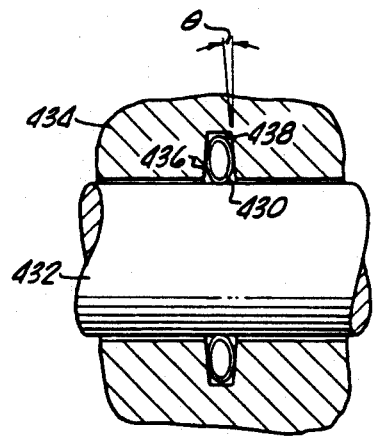
FIG. 18 is a cross-sectional view of an alternative embodiment of the present invention in which an electromagnetic shield axial spring is disposed in a tapered groove for causing both axial comprised of the spring upon radial loading thereof.

An axially resilient spring 430 is shown in another embodiment of the present invention in FIG. 18 and is disposed between a shaft 432 and a housing 430 within a tapered groove 436. The taper of the groove may have an angle $\theta$ from between about 0 and 5 degrees in order to cause axial loading of the spring 430 as the spring 430 is radially loaded between the shaft 432 and a bottom 438.

Figure 19:
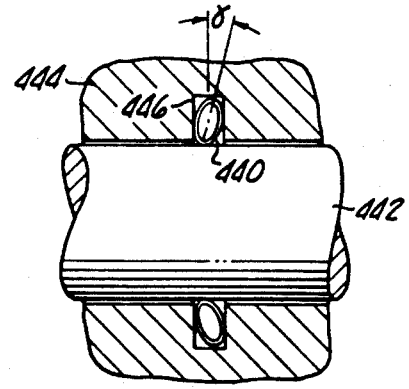
FIG. 19 is a cross-sectional view of an alternative embodiment of the present invention in which the shield spring is disposed with a turn angle in a housing groove.

FIG. 19 shows yet another embodiment of the present invention in which an axial spring 440 is disposed between a shaft 442 and housing 444 within a groove 446 in which the spring shield 440 has a turn angle $\gamma$ as hereinbefore described in connection with the description of the spring characteristics of springs suitable for the use in the present invention.

The shielding of microwaves is accomplished by deflecting the coils either radially or axially to the point that they nearly abutt, thus allowing a small space to take care of the eccentricities and tolerance variations while the space or open area therebetween is minimal.

Figures 20A, 20B, 20C:
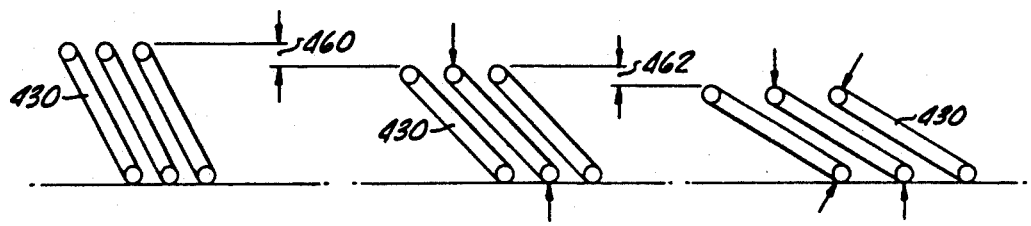
FIG. 20 (a), (b) and (c) are cross-sectional views of a spring shield under no load, axial load and both axial and radial load register.

FIG. 20a shows the top view of a spring in an unloaded position, while FIG. 20b shows the top view of a spring under axial load showing an axial deflection 460. FIG. 20c shows a top view of a spring under both axial and radial loading with an axial and radial deflection 462. As shown in FIG. 20b, the coils are compressed to a nearly abutting position for enhancing the electromagnetic shield and capability of the spring shield when disposed under load between a shaft 432 and housing 434.

It should be noted that the spring of the present invention may be coated with a conductive material such as an elastomer filled with copper particles or some other metallic conductive material in order to enhance its conductivity. Alternatively, the springs of the present invention may be plated or coated with a soft metal such as tin, gold or silver to enhance the conductivity thereof. These springs itself may be formed from a beryllium copper for high conductivity, stainless steel or Monel, as specific examples.

Although there has been described hereinabove a specific electromagnetic shield in accordance with the present invention for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. An electromagnetic shield for a rotary/reciprocating shaft comprising:

garter-type resilient coil spring means for blocking the propagation of electromagnetic waves therepast, said coil spring means comprising a plurality of individual coil means for causing the coil spring means to block the propagation of electromagnetic waves therepast independent of compression of the coil spring means within a range of deflection of the individual coil means, said individual coil means being canted along a centerline thereof and comprising;

back angle means for both defining the disposition of a trailing portion of each coil means with respect to a line normal to the centerline and for determining the force-deflection characteristics of the coil spring means;

front angle means for defining the disposition of a leading portion of each coil means with respect to the normal line, said front angle means being greater than said back angle means;

said coil means being interconnected in a manner forming a garter-type resilient coiled spring with the trailing portion along an outside diameter of the garter-type axially resilient coiled spring and the leading portion along an inside diameter of the garter-type resilient coiled spring; and means for supporting the garter-type resilient coil spring between a shaft and a housing surrounding the shaft.

2. The electromagnetic shield according to claim 1 wherein said coil means are interconnected in a manner forming an axially resilient coiled spring.

3. The electromagnetic shield according to claim 1 wherein said coil means are interconnected in a manner forming a radially resilient coiled spring.

4. The electromagnetic shield according to claim 1 further comprising a conductive elastomer disposed within said garter-type resilient coil spring means.

5. The electromagnetic shield according to claim 1 wherein said means for supporting the garter-type resilient coil spring comprises a groove disposed in said housing.

6. The electromagnetic shield according to claim 1 wherein said means for supporting the garter-type resilient coil spring comprises a groove disposed in said shaft.

7. The electromagnetic shield according to claim 5 further comprises means for causing axial loading of said garter-type resilient coil spring upon radial loading of said garter-type resilient coil spring in order to enhance the electromagnetic shielding characteristics of the garter-type resilient coil spring by reducing coil spacing thereof.

8. The electromagnetic shield according to claim 7 wherein said means for causing axial loading of said garter-type resilient coil spring comprises means defining tapered groove walls for axially compressing said garter-type resilient coil spring.

9. The electromagnetic shield according to claim 8 wherein said individual coil means are compressed to a nearly abutting relationship by said tapered groove walls when said garter-type resilient coil spring is radially loaded.

10. The electromagnetic shield according to claim 2 wherein the back angle means is greater than about one degree and less than about 40 degrees and the front angle means is greater than about 15 degrees and less than about 55 degrees.

11. The electromagnetic shield according to claim 2 wherein the back angle means defines a working deflection in which the garter-type axially resilient electromagnetic shielding spring gasket exerts a generally constant force in an axial direction in response to deflection of the spring gasket in the axially direction, said working deflection being between about 5 percent and about 50 percent deflection of the spring gasket.

12. An electromagnetic shield for a rotary/ reciprocating shaft comprising:

garter-type axially resilient coil spring means for blocking the propagation of electromagnetic waves therepast, said coil spring means comprising a plurality of individual coil means for causing the coil spring means to block the propagation of electromagnetic waves therepast independent of compression of the coil spring means within a range of deflection of the individual coil means, said individual coil means being canted along a centerline thereof and comprising;

back angle means for both defining the disposition of a trailing portion of each coil means with respect to a line normal to the centerline and for determining the working resilient range of the coil spring means;

front angle means for defining the disposition of a leading portion of each coil means with respect to the normal line, said front angle means being greater than said back angle means;

said coil means being interconnected in a manner forming a garter-type axially resilient coiled spring with the trailing portion along an inside diameter of the garter-type axially resilient coiled spring and the leading portion along an outside diameter of the garter-type axially resilient coiled spring; and means for supporting the garter-type axially resilient coil spring between a shaft and a housing surrounding the shaft.

13. The electromagnetic shield according to claim 12 wherein the front angle is less than 35 degrees.

14. The electromagnetic shield according to claim 13 wherein the plurality of coils are canted in a clockwise direction.

15. The electromagnetic shield according to claim 13 wherein the back angle is greater than one degree and less than 35 degrees.

16. The electromagnetic shield according to claim 15 wherein the back angle means defines a working deflection in which the spring gasket exerts a generally constant force in an axial direction in response to deflection of the spring gasket in the axial direction, said working deflection being between about 5 percent and about 50 percent deflection of the spring gasket.

17. The electromagnetic shield according to claim 13 wherein the back angle is less than about 11 degrees.

18. An electromagnetic shield for a rotary/reciprocating shaft comprising:

garter-type coil spring means for blocking the propagation of electromagnetic waves therepast, said coil spring means comprising a plurality of individual coil means for causing the coil spring means to block the propagation of electromagnetic waves therepast independent of compression of the coil spring means within a range of deflection of the individual coil means, said individual coil means being interconnected with one another and disposed in a canted relationship with a centerline of the coil spring means; and means for supporting the garter-type resilient coil spring between a shaft and a housing surrounding the shaft comprising a groove disposed in said shaft.

19. An electromagnetic shield for a rotary/reciprocating shaft comprising:

garter-type coil spring means for blocking the propagation of electromagnetic waves therepast, said coil spring means comprising a plurality of individual coil means for causing the coil spring means to block the propagation of electromagnetic waves therepast independent of compression of the coil spring means within a range of deflection of the individual coil means, said individual coil means being interconnected with one another and disposed in a canted relationship with a centerline of the coil spring means; and means for causing axial loading of said garter-type resilient coil spring upon radial loading of said garter-type resilient coil spring in order to enhance the electromagnetic shielding characteristics of the garter-type resilient coil spring by reducing coil spring thereof.

20. The electromagnetic shield according to claim 19 wherein said means for causing axial loading of said garter-type resilient coil spring comprises means defining tapered groove walls for axially compressing said garter-type resilient coil spring.

21. The electromagnetic shield according to claim 20 wherein said individual coil means are compressed to an abutting relationship by said tapered groove walls when said garter-type resilient coil spring is radially loaded.

22. An electromagnetic shield for a rotary/ reciprocating shaft comprising:

radially resilient canted coil spring means for blocking the propagation of electromagnetic waves therepast, said coil spring means comprising a plurality of individual coil means for causing the coil spring means to block the propagation of electromagnetic waves therepast independent of compression of the coil spring means within a range of deflection of the individual coil means, said individual coil means being canted along a centerline thereof and comprising;

back angle means for defining the disposition of a trailing portion of each coil means with respect to a line normal to the centerline;

front angle means for defining the disposition of a leading portion of each coil means with respect to the normal line, said front angle means being greater than said back angle means;

means orienting said plurality of coils at a turn angle for defining the load-deflection characteristics of the radially resilient canted coiled spring means, said turn angle being greater than zero degrees and less than 90 degrees; and means for supporting the radially resilient canted coil spring means between a shaft and a housing surrounding the shaft.

23. The electro shield according to claim 22 wherein the trailing portion is disposed along an outside diameter of the radially loaded canted coiled spring and the leading portion is disposed along an inside diameter of the radially resilient canted coiled spring.

24. The radially resilient canted coiled spring according to claim 26 wherein the trailing portion is disposed along an inside diameter of the radially loaded canted coiled spring and the leading portion is disposed along an outside diameter of the radially resilient canted coiled spring.

25. The electromagnetic shield according to claim 22 wherein said means for supporting the garter-type resilient coil spring comprises a groove disposed in said housing.

26. The electromagnetic shield according to claim 22 wherein said means for supporting the garter-type resilient coil spring comprises a groove disposed in said shaft.

27. The electromagnetic shield according to claim 25 further comprises means for causing axial loading of said garter-type resilient coil spring upon radial loading of said garter-type resilient coil spring in order to enhance the electromagnetic shielding characteristics of the garter-type resilient coil spring by reducing coil spacing thereof.

28. The electromagnetic shield according to claim 27 wherein said means for causing axial loading of said garter-type resilient coil spring comprises means defining tapered groove walls for axially compressing said garter-type resilient coil spring.

29. The electromagnetic shield according to claim 28 wherein said individual coil means are compressed to a nearly abutting relationship by said tapered groove walls when said garter-type resilient coil spring is radially loaded.

* * * * *